United States Patent
Kim et al.

(10) Patent No.: US 8,427,616 B2
(45) Date of Patent: Apr. 23, 2013

(54) BISTABLE CHIRAL SPLAY NEMATIC MODE CRYSTAL DISPLAY DEVICE

(75) Inventors: Dong-Guk Kim, Gyeonggi-do (KR);
Wook-Sung Kim, Gyeonggi-do (KR);
Dong-Jin Kim, Gyeonggi-do (KR);
Jae-Chang Kim, Busan (KR);
Joong-Ha Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 65 days.

(21) Appl. No.: 13/231,317

(22) Filed: Sep. 13, 2011

(65) Prior Publication Data

US 2012/0162578 A1 Jun. 28, 2012

(30) Foreign Application Priority Data

Dec. 24, 2010 (KR) ........................ 10-2010-0135018

(51) Int. Cl.
*G02F 1/1343* (2006.01)
(52) U.S. Cl.
USPC .............. 349/139; 349/48; 349/177; 349/179
(58) Field of Classification Search .................... None
See application file for complete search history.

(56) References Cited

U.S. PATENT DOCUMENTS 6,784,955 B2 * 8/2004 Kwok et al. .................... 349/99
2010/0091208 A1 * 4/2010 Kramer et al. ................. 349/33

OTHER PUBLICATIONS

Jhun et al., Tristate liquid crystal display with memory and dynamic operating modes, American Institute of Physics, Applied Physics Letters 89, 123507, pp. 1-3, Sep. 2006.

* cited by examiner

*Primary Examiner* — Richard Kim
(74) *Attorney, Agent, or Firm* — Morgan, Lewis & Bockius LLP

(57) ABSTRACT

A bistable chiral splay nematic mode liquid crystal display device including a first substrate; a first electrode on the first substrate, the first electrode having a plate shape; a first insulating layer covering the first electrode; a second electrode and a third electrode on the first insulating layer along a first direction; a second substrate facing the first substrate; a fourth electrode on the second substrate, the fourth electrode having a plate shape; a second insulating layer covering the fourth electrode; a fifth electrode and a sixth electrode on the second insulating layer along a second direction; and a bistable chiral splay nematic liquid crystal layer between the first substrate and the second substrate.

20 Claims, 5 Drawing Sheets

BISTABLE CHIRAL SPLAY NEMATIC MODE CRYSTAL DISPLAY DEVICE

The present application claims the benefit of Korean Patent Application No. 10-2010-0135018, filed in Korea on Dec. 24, 2010, which is hereby incorporated by reference.

BACKGROUND OF THE INVENTION

1. Field of the Invention

The present invention relates to a liquid crystal display device, and more particularly, to a bistable chiral splay nematic (BCSN) mode liquid crystal display device being switchable between a memory mode and a dynamic mode.

2. Discussion of the Related Art

Recently, as the society has entered in earnest upon an information age, a field of display devices that represent all sorts of electrical signals as visual images has developed rapidly. Particularly, since the LCD device has characteristics of light weight, thinness and low power consumption, the LCD device has been widely used as a substitute for the cathode-ray tube display device.

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has high resolution and excellent characteristics for displaying moving images, the AM-LCD device has become widely used.

Figure 1:
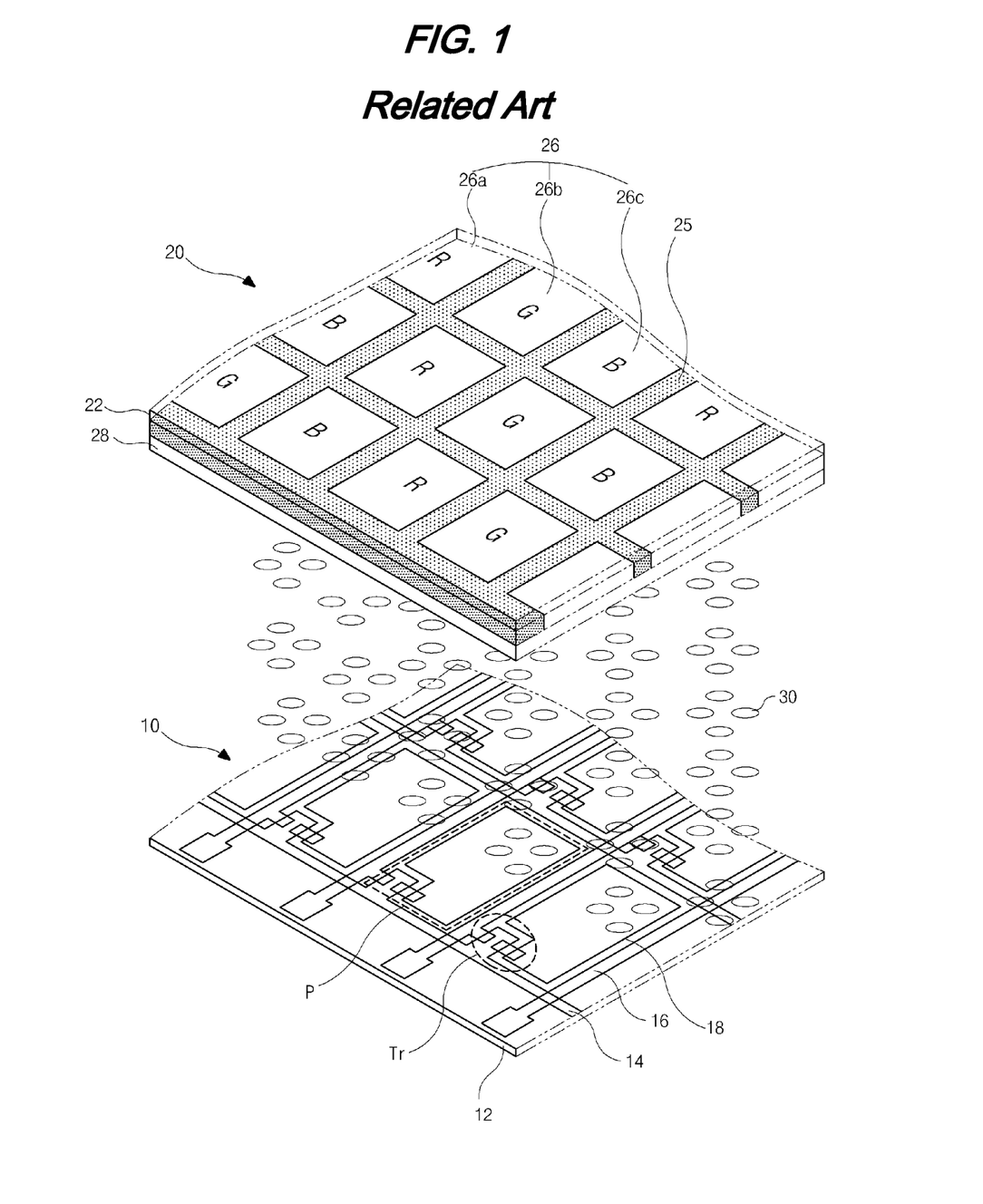
FIG. 1 is an exploded perspective view of a related art liquid crystal panel.

FIG. 1 is an exploded perspective view of a related art liquid crystal panel. As shown in FIG. 1, the liquid crystal panel includes an array substrate 10, a color filter substrate 20, and a liquid crystal layer 30. The array substrate 10 and the color filter substrate 20 face each other, and the liquid crystal layer 30 is interposed therebetween.

The array substrate 10 includes a first substrate 12, a gate line 14, a data line 16, a thin film transistor (TFT) "Tr", and a pixel electrode 18. The gate and data lines 14 and 16 are formed on the first substrate 12 and cross each other to define a pixel region "P". The TFT "Tr" is formed at a crossing portion of the gate and data lines 14 and 16. The pixel electrode 18 is formed in the pixel region "P" and connected to the TFT "Tr".

The color filter substrate 20 includes a second substrate 22, a black matrix 25, a color filter layer 26, and a common electrode 28. The black matrix 25 is formed on the second substrate 22 and has a lattice shape. The black matrix 25 corresponds to a non-display region of the first substrate 12. The non-display region of the first substrate 12 includes the gate and data lines 14 and 16 as well as the TFT "Tr". The color filter layer 26 corresponds to the pixel region "P" and includes red, green and blue color filter patterns 26a, 26b and 26c. The common electrode 28 is formed on the black matrix 25 and the color filter layer 28. The common electrode 28 generates an electric field with the pixel electrode 18 such that the liquid crystal layer 30 is driven by the electric field.

Though not shown, a seal pattern is formed along edges of the first and second substrates 12 and 22. The seal pattern prevents the liquid crystal layer 30 from overflowing. In addition, first and second alignment layers may be formed between the first substrate 12 and the liquid crystal layer 30 and between the second substrate 22 and the liquid crystal layer 30. A polarization plate may be formed on an outer surface of one of the first and second substrates 12 and 22. A backlight assembly is formed on a rear side of the first substrate 12 to apply light into the liquid crystal panel. When a scan signal is applied to the TFT "Tr" through the gate line 14 to turn on the TFT "Tr", an image signal is applied to the pixel electrode 18 through the data line 16 such that an electric field is generated between the pixel electrode 18 and the common electrode 28. As a result, the liquid crystal molecules in the liquid crystal layer 30 are driven by the electric field to display images.

The liquid crystal molecules may be classified into a nematic mode, a smectic mode and a cholesteric mode. Among these liquid crystal molecules, the nematic mode liquid crystal molecule, by which light is strongly scattered, is widely used.

An electro-optic effect of the liquid crystal molecules is to generate an electro-optical modulation by changing optical properties of a liquid crystal cell. The electro-optic effect is generated by changing an arrangement of the liquid crystal molecules.

Arrangement of the nematic mode liquid crystal molecules is continuously changed with an electric field. Generally, the nematic mode liquid crystal molecules are driven by an electric field in a twisted nematic (TN) mode or an in-plane switching (IPS) mode. The nematic liquid crystal molecules are aligned to be parallel to a substrate and twisted. In the TN mode LCD device, the nematic liquid crystal molecules are driven by a vertical electric field. In the IPS mode LCD device, the nematic liquid crystal molecules are driven by a horizontal electric field.

Recently, various display devices have been introduced to meet customers' requirements. Particularly, devices having advantages in a thickness, a weight and power consumption are introduced. In addition, the devices are required to have functions of displaying a moving image and an e-book or an e-paper. Accordingly, an LCD device being switchable in a dual mode, e.g., a dynamic mode for the moving image and a memory mode for the e-book or the e-paper is required. To meet the requirements, a bistable chiral splay nematic (BCSN) mode LCD device is introduced.

In the BCSN mode LCD device, the memory mode uses a bistable principle in a splay state and a π-twist state, and the dynamic mode uses a switching principle between a low bend state and a high bend state. Unfortunately, the memory mode and the dynamic mode in the BCSN mode LCD device have a difference in a black state, it is very difficult to provide a compensation film for compensating the black state in both the memory mode and the dynamic mode. Namely, because the black state in only one of the memory mode and the dynamic mode is optimized by the compensation film, the black state in the other one of the memory mode and the dynamic mode is deteriorated such that there is a disadvantage in a contrast ratio. As a result, there is a problem in an image display property of the LCD device.

SUMMARY OF THE INVENTION

Accordingly, the present invention is directed to a BCSN mode liquid crystal display device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a bistable chiral splay nematic mode liquid crystal display device including a first substrate; a first electrode on the first substrate, the first electrode having a plate shape; a first insulating layer covering the first electrode; a second electrode and a third electrode on the first insulating layer along a first direction; a second substrate facing the first substrate; a fourth electrode on the second substrate, the fourth electrode having a plate shape; a second insulating layer covering the fourth electrode; a fifth electrode and a sixth electrode on the second insulating layer along a second direction; and a bistable chiral splay nematic liquid crystal layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 2:
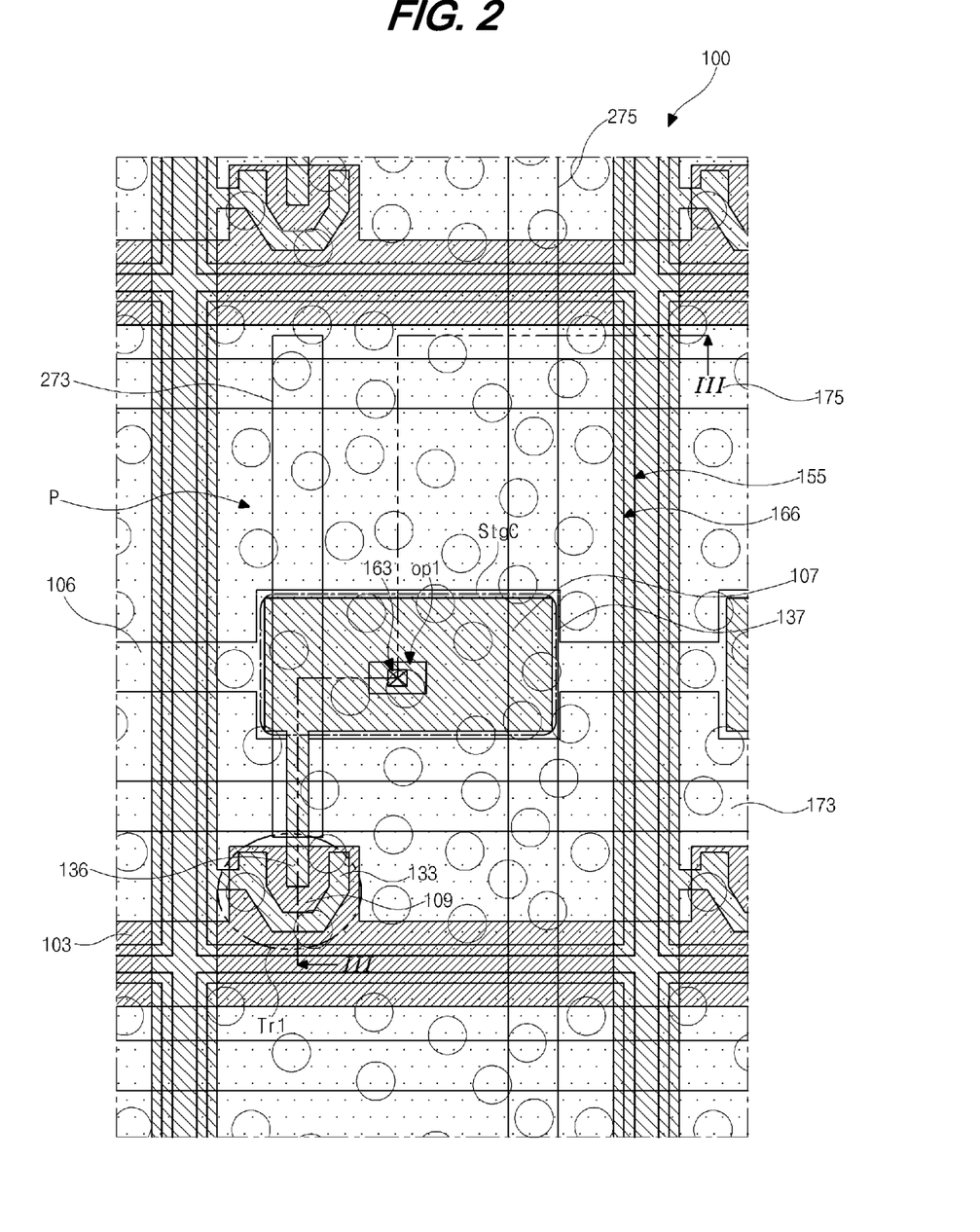
FIG. 2 is a plane-view showing a pixel region of a BCSN mode LCD device according to an exemplary embodiment of the present invention.
Figure 3:
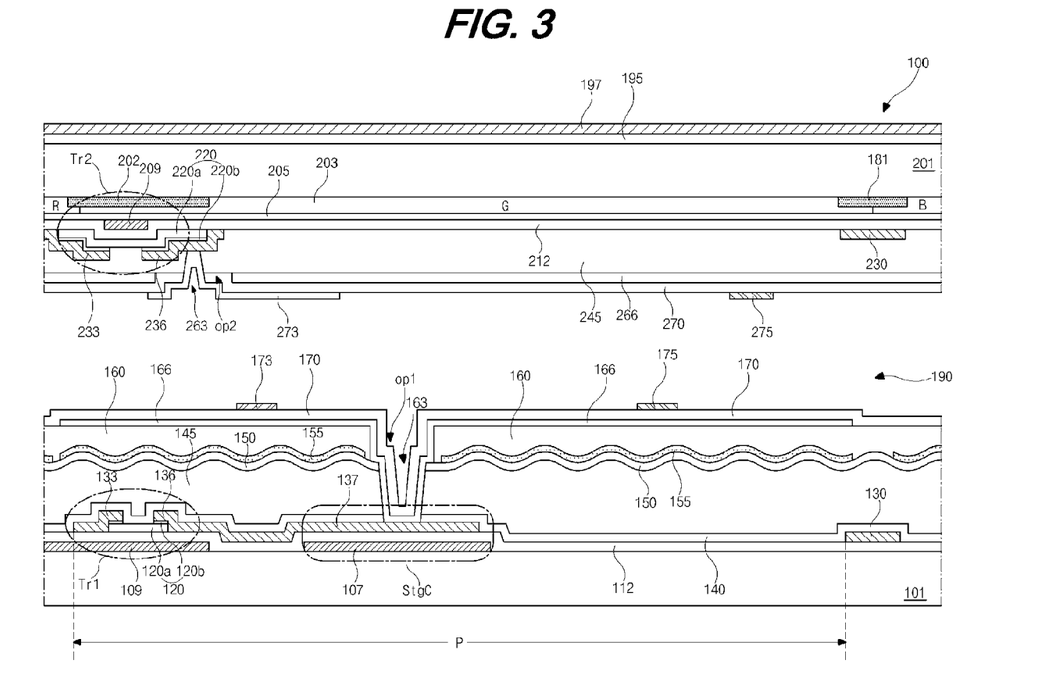
FIG. 3 is a cross-sectional view taken along the line III-III in FIG. 2.

FIG. 2 is a plane-view showing a pixel region of a BCSN mode LCD device according to an exemplary embodiment of the present invention, and FIG. 3 is a cross-sectional view taken along the line III-III in FIG. 2. FIG. 2 is focused on a lower substrate as a first substrate.

As shown in FIGS. 2 and 3, a BCSN mode LCD device 100 includes a first substrate 101, where a pixel region "P" is defined and a first thin film transistor (TFT) "Tr1" as a switching element, first to third electrodes 166, 173 and 175 and a reflection plate 155 are formed, a second substrate 201, where a second TFT "Tr2" and fourth to sixth electrodes 266, 273 and 275, a liquid crystal layer 190 between the first and second substrates 101 and 201, and a compensation film 195. The BCSN mode LCD device 100 may further include a polarization plate 197.

The first substrate 101 includes a display region and a non-display region at a periphery of the display region. For example, the first substrate 101 may include first and second non-display region at both sides of the display region. The pixel region "P" is positioned in the display region. The first TFT "Tr1" is positioned in each pixel region "P", and the reflection electrode 155 may have an embossing shape. The liquid crystal layer 190 includes BCSN liquid crystal molecules. In other words, the BCSN mode LCD device 100 includes a BCSN liquid crystal layer 190.

The first substrate 101 is formed of transparent glass, a flexible plastic or a flexible film. A first gate line 103 and a first data line 130 are disposed on the first substrate 101 with a first gate insulating layer 112 therebetween. The first gate line 103 and the first data line 130 cross each other to define the pixel region "P".

A common line 106 being substantially parallel to the first gate line 103 is disposed on the first substrate 101. The common line 106 runs across adjacent pixel regions "P". A portion of the common line 106 has a larger width than other portions to form a first storage electrode 107 to increase a storage capacitance. Alternatively, the first storage electrode 107 may have the same width as the common line 106.

The first TFT "Tr1" is positioned at a crossing portion of the first gate line 103 and the first data line 130. The first TFT "Tr1" includes a first gate electrode 109, the first gate insulating layer 112, a first semiconductor layer 120, a first source electrode 133 and a first drain electrode 136. The first gate electrode 109 is connected to the first gate line 103, and the first source electrode 133 is connected to the first data line 130. As a result, the first TFT "Tr1" is electrically connected to the first gate line 103 and the first data line 130. The first semiconductor layer 120 includes a first active layer 120a of intrinsic amorphous silicon and a first ohmic contact layer 120b of impurity-doped amorphous silicon. The first drain electrode 136 is spaced apart from the first source electrode 133.

The first drain electrode 136 extends to overlap the first storage electrode 107. The overlapped portion of the first drain electrode 136 serves as a second storage electrode 137. The first storage electrode 107, the second storage electrode 137 and the gate insulating layer 112 therebetween constitute a storage capacitor "StgC".

A first passivation layer 140 is disposed on the first TFT "Tr1", the storage capacitor "StgC" and the first data line 130. Namely, the first passivation layer 140 covers the first TFT "Tr1", the storage capacitor "StgC" and the first data line 130. For example, the first passivation layer 140 may be formed of an inorganic insulating material. In addition, a second passivation layer 145 is disposed on the first passivation layer 140. The second passivation layer 145 may have an uneven top surface and be formed of an organic insulating material. In other words, the second passivation layer 145 has an embossing top shape.

A third passivation layer 150 is disposed on the second passivation layer 145, and the reflection plate 155 is disposed on the third passivation layer 150. The third passivation layer 150 may be formed of an inorganic material, and the reflection plate 155 may be formed of a high reflective metallic material. For example, the reflection plate 155 may be formed of aluminum (Al) or Al alloy. The reflection plate 155 covers an entire of each pixel regions "P". Namely, the reflection plate 155 covers the pixel regions "P" and partially overlaps the first gate line 103 and the first data line 130. The reflection plate 155 has a first opening "op1".

The third passivation layer 150 and the reflection plate 155 also have the embossing top shape due to the second passivation layer 145. In other words, the third passivation layer 150 and the reflection plate 155 have an uneven top surface. Since a mirror reflection is prevented by the embossing top shape of the reflection plate 155, reflection efficiency is improved.

FIG. 3 shows the first to third passivation layers 140, 145 and 150. Alternatively, the first and third passivation layers 140 and 150 may be omitted. If the second passivation layer 145 of the organic insulating material contacts the first active layer 120a without the first passivation layer 140 of the inorganic insulating material, properties of the first TFT "Tr1" may be degraded. If the reflection plate 155 of the metallic material is stacked on the second passivation layer 145 of the organic insulating material without the third passivation layer 150 of the inorganic insulating material, an adhesive strength between the reflection plate 155 and the second passivation layer 145 is lowered. Accordingly, to prevent these problems, the first and third passivation layers 140 and 150 are generally used.

A fourth passivation layer 160 is disposed on the reflection plate 155. The fourth passivation layer 160 is formed of an organic insulating material or an inorganic insulating material and has a thickness above about 1 micrometer. As a result, the fourth passivation layer 160 has an even top surface. When the fourth passivation layer 160 has the embossing top shape due to the reflection plate 155, the BCSN liquid crystal layer 190 has a non-uniform thickness. Accordingly, the fourth passivation layer 160 has an enough thickness to provide an even top surface.

When the fourth passivation layer 160 is formed of an organic insulating material, a fifth passivation layer (not shown), which is formed of an inorganic insulating material, may be formed between the reflection plate 155 and the fourth passivation layer 160 to compensate an adhesive strength between the reflection plate 155 and the fourth passivation layer 160.

A first drain contact hole 163 is formed through the first to fourth passivation layers 140, 145, 150 and 160 to expose the second storage electrode 137. The first drain contact hole 163 corresponds to the first opening "op1" in the reflection plate 155. On the other hand, when the fifth passivation layer (not shown) is formed, the first drain contact hole 163 is formed also through the fifth passivation layer.

The first electrode 166 having a plate shape is disposed on the fourth passivation layer 160. The first electrode 166 contacts the second storage electrode 137 through the first drain contact hole 163. As a result, the first electrode 166 is electrically connected to the first TFT "Tr1". The first electrode 166 covers an entire of each pixel region "P" to completely overlap the reflection plate 155. The first electrode 166 is formed of a transparent conductive material, such as indium-tin-oxide (ITO) and indium-zinc-oxide (IZO).

A sixth passivation layer 170 is disposed on the first electrode 166. The sixth passivation layer 170 may be formed of an inorganic insulating material. The second and third electrodes 173 and 175 are disposed on the sixth passivation layer 170. The second and third electrodes 173 and 175 are substantially parallel to the first gate line 103 and spaced apart from each other. The second and third electrodes 173 and 175 run across adjacent pixel regions "P" and have a linear bar shape. The second and third electrodes 173 and 175 may be formed of a transparent conductive material such as ITO and IZO. The common line 106 may be positioned between the second third electrodes 173 and 175.

FIGS. 2 and 3 show one second electrode 173 and one third electrode 175. Alternatively, at least two second electrodes 173 and at least two third electrodes 175 may be disposed to be alternately arranged with each other. For example, the second electrodes 173 and the third electrodes 175 may be arranged in an order of the second electrode 173, the third electrode 175, the second electrode 173 and the third electrode 175. A total number of the second and third electrodes 173 and 175 may be six, eight or ten.

An end of each second electrode 173 is connected to a first auxiliary line (not shown) at one side of a display region, i.e., the first non-display region, of the first substrate 101, and an end of each third electrode 175 is connected to a second auxiliary line (not shown) at the other one side of the display region, i.e., the second non-display region, of the first substrate 101. Accordingly, a first voltage is applied to all second electrodes 173 through the first auxiliary line, and a second voltage, which is different from the first voltage, is applied to all third electrodes 175 through the second auxiliary line.

Although not shown, a first alignment layer is formed on the second and third electrodes 173 and 175 and the sixth passivation layer 170.

On the other hand, a second gate line (not shown) and a second data line 230 are disposed on the second substrate 201 with a second gate insulating layer 212 therebetween. The second gate line and the second data line 230 cross each other. The second gate line and the second data line 230 correspond to the first gate line 103 and the first data line 130, respectively.

The second TFT "Tr2" is positioned at a crossing portion of the second gate line and the second data line 230. The second TFT "Tr2" includes a second gate electrode 209, the second gate insulating layer 212, a second semiconductor layer 220, a second source electrode 233 and a second drain electrode 236. The second gate electrode 209 is connected to the second gate line, and the second source electrode 233 is connected to the second data line 230. As a result, the second TFT "Tr2" is electrically connected to the second gate line and the second data line 230. The second semiconductor layer 220 includes a second active layer 220a of intrinsic amorphous silicon and a second ohmic contact layer 220b of impurity-doped amorphous silicon. The second drain electrode 236 is spaced apart from the second source electrode 233.

A planarization layer 245 is disposed on the second TFT "Tr2" and the second data line 230. Namely, the planarization layer 245 covers the second TFT "Tr2" and the second data line 230.

A color filter layer 183 including red, green and blue color filter patterns "R", "G" and "B" and a black matrixes 181 and 202 are disposed between the second substrate 201 and the second TFT "Tr2". The color filter layer 183 corresponds to each pixel region "P". The black matrixes 181 and 202 correspond to the second data line 230, the second gate line, and the second TFT "Tr2".

The fourth electrode 266 having a plate shape is disposed on the planarization layer 245. The fourth electrode 266 is formed of a transparent conductive material such as ITO and IZO. The fourth electrode 266 has a second opening "op2" corresponding to the second drain electrode 236 of the second TFT "Tr2".

FIG. 3 shows the fourth electrode 266 disposed on the planarization layer 245 and having the second opening "op2". Alternatively, the fourth electrode 266 may be disposed under the second TFT "Tr2". For example, the fourth electrode 266 may be positioned between the color filter layer 183 and the second substrate 201.

A seventh passivation layer 270 is disposed on the fourth electrode 266. A second drain contact hole 263 is formed through the seventh passivation layer 270 and the planarization layer 245. The second drain contact hole 263 corresponds to the second opening "op2" such that the second drain electrode 236 is exposed through the second drain contact hole 263.

The fifth electrode 273 and the sixth electrode 275 are disposed on the seventh passivation layer 270. The fifth electrode 273 contacts the second drain electrode 236 through the second drain contact hole 263 to be electrically connected to the second TFT "Tr2". The fifth electrode 273 and the sixth electrode 275 are parallel to each other and cross the second and third electrodes 173 and 175 on the first substrate 101. The fifth electrode 273 and the sixth electrode 275 have a linear bar shape.

The sixth electrode 275 severs as a reference electrode. Accordingly, the sixth electrode 275 runs across the pixel regions "P". Alternatively, the sixth electrode 275 may be branched from a third auxiliary line (not shown), which is formed to be parallel to the second gate line, to be parallel to the fifth electrode 273.

Although not shown, a second alignment layer is formed on the fifth and sixth electrodes 273 and 275 and the seventh passivation layer 270.

The BCSN liquid crystal layer 190, which includes nematic liquid crystal molecules with a chiral dopant for being enable the nematic liquid crystal molecules to be twisted, is disposed between the first and second substrates 101 and 201, and the compensation film 195 is disposed on an outer side of the second substrate 201. The compensation film 195 is a λ/2 retardation film. In addition, the polarization plate 197 is disposed on an outer side of the compensation film 195.

Hereinafter, a driving principle of the BCSN mode LCD device will be illustrated. The BCSN mode LCD device according to the present invention is driven by a reflective type without a backlight unit.

Figure 4:
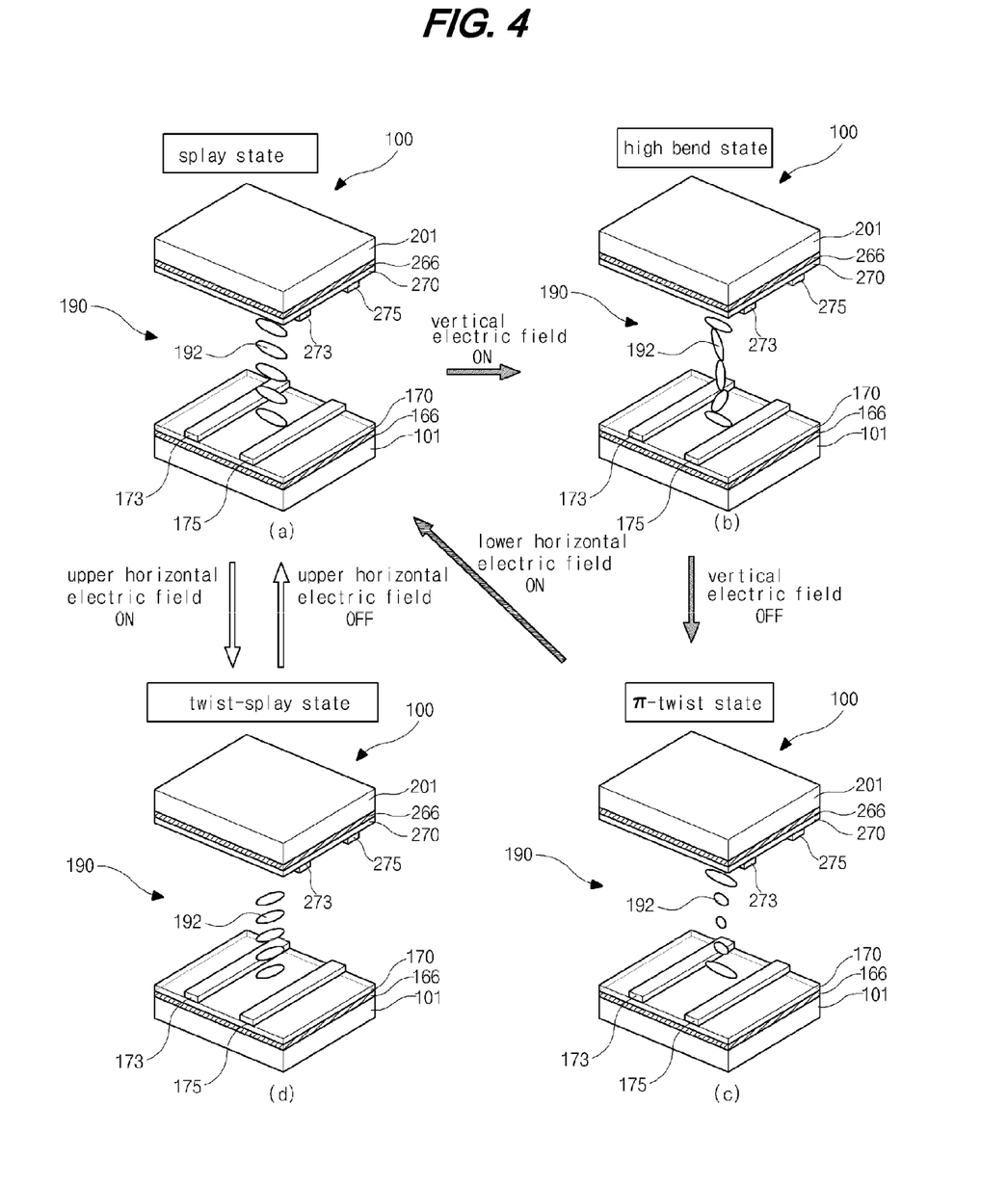
FIG. 4 is a view illustrating a driving principle of a BCSN mode LCD device according to an exemplary embodiment of the present invention.

FIG. 4 is a view illustrating a driving principle of a BCSN mode LCD device according to an exemplary embodiment of the present invention. FIG. 4 schematically shows the first and second substrates, the first to sixth electrodes, and liquid crystal molecules in the BCSN liquid crystal layer.

In the BCSN mode LCD device, the first alignment layer (not shown) on the first substrate 101 and the second alignment layer (not shown) on the second substrate 201 are aligned along the same direction. An alignment direction of the first and second alignment layers is substantially perpendicular to a length direction of the second and third electrodes 173 and 175. Namely, the alignment direction of the first and second alignment layers is substantially parallel to the fifth and sixth electrodes 273 and 275.

As shown in FIG. 4(a), a major axis of the liquid crystal molecules 192 in the BCSN liquid crystal layer 190 is initially arranged along the alignment direction of the first and second alignment layers. In other words, the major axis of the liquid crystal molecules 192 in the BCSN liquid crystal layer 190 is initially arranged to be perpendicular to the second and third electrodes 173 and 175. In addition, the liquid crystal molecules 192 has a splay state where the major axis of the liquid crystal molecules 192 in the BCSN liquid crystal layer 190 has a pre-determined angle with respect to a surface of the first and second substrates 101 and 201. Namely, the major axis of the liquid crystal molecules 192 in the BCSN liquid crystal layer 190 is inclined to the surface of the first and second substrates 101 and 201. The BCSN mode LCD device 100 has a black state in the memory mode and the dynamic mode with the splay state.

In the memory mode of the BCSN mode LCD device 100, when different voltages are respectively applied to the first electrode 166 on the first substrate 101 and the fourth electrode 266 on the second substrate 201 to turn on a vertical electric field between the first and fourth electrodes 166 and 266, a tilting angle of the liquid crystal molecules 192, which initially have the splay state, is changed without changing an azimuth angle of the liquid crystal molecules 192, as shown in FIG. 4(b), such that the liquid crystal molecules 192 has a high bend state.

When the vertical electric field between the first and fourth electrodes 166 and 266 is turned off with the liquid crystal layers 190 having the high bend state, the liquid crystal molecules 192 between the liquid crystal molecules adjacent to the first and second alignment layers are rotated by 180 degrees with respect to the liquid crystal molecules 192 adjacent to the first alignment layer, as shown in FIG. 4(c). As a result, the liquid crystal molecules 192 have a π-twist state. With the π-twist state, the liquid crystal molecules 192 have a bistable principle such that the BCSN mode LCD device 100 provides the memory mode.

Since the nematic liquid crystal molecules with the chiral dopant used in the present invention are stable in the splay state and the π-twist state, the nematic liquid crystal molecules can maintain these states without other electric field such that the BCSN mode LCD device has semi-permanent memory mode.

On the other hand, when a lower horizontal electric field between the second and third electrodes 173 and 175 is turned on with the liquid crystal layer 190 having the π-twist state, the liquid crystal molecules 192 have the splay state as shown in FIG. 4(a).

Since the liquid crystal molecules 192 are stable in the splay state, the BCSN liquid crystal layer 190 maintains the splay state without the vertical electric field between the first and fourth electrodes 166 and 266. The liquid crystal molecules 192 are driven in a normally black mode with the splay state without continuous electric field between the second and third electrodes 173 and 175. Namely, without further applying the voltages into the second and third electrodes 173 and 175, the BCSN mode LCD device 100 provides the same image or letter for a long time in the memory mode. Accordingly, power consumption is minimized.

Accordingly, the BCSN mode LCD device 100 can be used to applications such as an e-book or an e-paper, which displays the letters for several milliseconds or several hours, with reduced power consumption. As a result, the applications are used for long times without charging the battery.

On the other hand, the BCSN mode LCD device 100 can be driven in the dynamic mode. In the dynamic mode, different voltages are applied to the fifth and sixth electrodes 273 and 275 on the second substrate 201 to generate an upper horizontal electric field into the BCSN mod liquid crystal layer 190 having the splay state and the black state. Since a major axis of the liquid crystal molecules 192 in the splay state is not parallel to a direction of the upper horizontal electric field between the fifth and sixth electrodes 273 and 275, the liquid crystal molecules 192 are rotated along the upper horizontal electric field such that the BCSN liquid crystal layer 190 has a twist-splay state as shown in FIG. 4(d). A rotational angle of the liquid crystal molecules 192 depends on a voltage difference between the fifth and sixth electrodes 273 and 275, i.e., an intensity of the upper horizontal electric field. Accordingly, the BCSN mode LCD device 100 displays white and gray in the dynamic mode by controlling the voltage difference between the fifth and sixth electrodes 273 and 275.

As mentioned above, both the memory mode and the dynamic mode of the BCSN mode LCD device 100 have the black state in the splay state of the liquid crystal molecules 192. Namely, two modes have the black state in a single state of the liquid crystal molecules 192. One compensation film can compensate the black state in both the memory mode and the dynamic mode. Accordingly, even when the BCSN mode LCD device 100 is driven in one mode of the memory mode and the dynamic mode, a problem in the black state is compensated by the compensation film such that the device can display an improved black image. As a result, the device has an improved contrast ratio.

Figure 5:
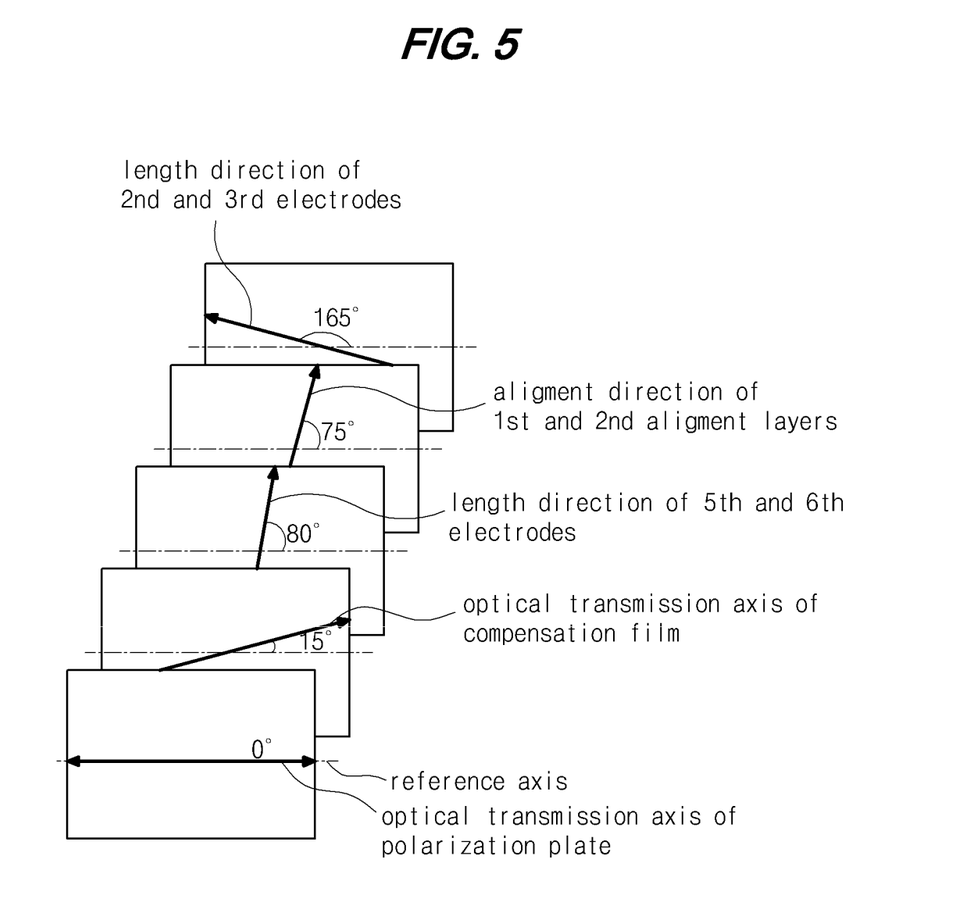
FIG. 5 is a view showing a positional relation of elements in a BCSN mode LCD device according to an exemplary embodiment of the present invention.

FIG. 5 is a view showing a positional relation of elements in a BCSN mode LCD device according to an exemplary embodiment of the present invention. For convenience of explanation, an optical transmission axis of the planarization plate on an outer side of the second substrate 201 is defined as a reference axis.

In the BCSN mode LCD device 100 according to an exemplary embodiment of the present invention, a length direction of the second and third electrodes 173 and 175 (of FIG. 2), which are parallel to each other and disposed on the first substrate 101 (of FIG. 3), has an angle of about 165 degrees with the reference axis. The alignment direction, i.e., a rubbing direction, of the first and second alignment layers, which are respectively disposed on the first and second substrates 101 and 201, has an angle of about 75 degrees with respect to the reference axis. In addition, a length direction of the fifth and sixth electrodes 273 and 275, which are parallel to each other and disposed on the second substrate 201 (of FIG. 3), has an angle of about 80 degrees with the reference axis. An optical transmission axis of the compensation film as a λ/2 retardation film has an angle of about 15 degrees with respect to the reference axis.

With the above positional relation, the BCSN mode LCD device in the present invention has an optimized black state in both of the memory mode and the dynamic mode.

In the simulation, the BCSN mode LCD device in the present invention has a reflective contrast ratio of about 1000:1 in both of the memory mode and the dynamic mode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A bistable chiral splay nematic mode liquid crystal display device, comprising:
   a first substrate;
   a first electrode on the first substrate, the first electrode having a plate shape;
   a first insulating layer covering the first electrode;
   a second electrode and a third electrode on the first insulating layer along a first direction;
   a second substrate facing the first substrate;
   a fourth electrode on the second substrate, the fourth electrode having a plate shape;
   a second insulating layer covering the fourth electrode;
   a fifth electrode and a sixth electrode on the second insulating layer along a second direction; and
   a bistable chiral splay nematic liquid crystal layer between the first substrate and the second substrate.

2. The device according to claim 1, wherein a black color is displayed in a splay state of the bistable chiral splay nematic liquid crystal layer in both of a memory mode and a dynamic mode.

3. The device according to claim 1, further comprising a λ/2 retardation film and a polarization plate film disposed on an outer side of the second substrate.

4. The device according to claim 3, wherein the λ/2 retardation film is positioned between the second substrate and the polarization plate.

5. The device according to claim 3, wherein an optical transmission axis of the λ/2 retardation film has an angle of about 15 degrees with respect to an optical transmission axis of the polarization plate.

6. The device according to claim 3, further comprising:
   a first alignment layer covering the second and third electrodes; and
   a second alignment layer covering the fifth and sixth electrodes,
   wherein an alignment direction of the first and second alignment layers has an angle of about 75 degrees with respect to an optical transmission axis of the polarization plate.

7. The device according to claim 3, wherein a length direction of the second and third electrodes has an angle of about 165 degrees with respect to an optical transmission axis of the polarization plate.

8. The device according to claim 3, wherein a length direction of the fifth and sixth electrodes has an angle of about 80 degrees with respect to an optical transmission axis of the polarization plate.

9. The device according to claim 1, wherein the second direction is different from the first direction.

10. The device according to claim 1, further comprising:
    a first gate line on the first substrate;
    a first data line on the first substrate and crossing the first gate line;
    a first thin film transistor on the first substrate and connected to the first gate line and the first data line,
    wherein the first electrode is electrically connected to the first thin film transistor.

11. The device according to claim 10, further comprising:
    a second gate line on the second substrate;
    a second data line on the second substrate and crossing the second gate line;
    a second thin film transistor on the second substrate and connected to the second gate line and the second data line,
    wherein the fifth electrode is electrically connected to the second thin film transistor.

12. The device according to claim 1, further comprising a reflection plate between the first substrate and the first electrode.

13. The device according to claim 12, wherein the reflection plate has an uneven top surface.

14. The device according to claim 1, wherein the first substrate defines a display region as well as first and second non-display regions at sides of the display region, and wherein the first electrode is disposed at portions corresponding to the display region.

15. The device according to claim 14, further comprising a first auxiliary line at the first non-display region and a second auxiliary line at the second non-display region,
    wherein an end of the second electrode is connected to the first auxiliary line, and an end of the third electrode is connected to the second auxiliary line.

16. The device according to claim 1, further comprising a color filter layer between the second substrate and the fifth electrode.

17. The device according to claim 16, wherein the fourth electrode is positioned between the color filter layer and the second substrate.

18. The device according to claim 16, wherein the fourth electrode is positioned between the color filter layer and the fifth electrode.

19. The device according to claim 1, wherein the bistable chiral splay nematic liquid crystal layer has a splay state for displaying a black color without a voltage to the first to sixth electrodes, wherein the bistable chiral splay nematic liquid crystal layer has a high bend state from the splay state with a vertical electric field between the first and fourth electrodes, wherein the bistable chiral splay nematic liquid crystal layer has a π-twist state from the high bend state by removing the vertical electric field, wherein the bistable chiral splay nematic liquid crystal layer has the splay sate from the π-twist state with a first horizontal electric field between the second and third electrodes, wherein the bistable chiral splay nematic liquid crystal layer has a twist-splay state from the splay state with a second horizontal electric field between the fifth and sixth electrodes, and wherein the bistable chiral splay nematic liquid crystal layer has the splay state from the twist-splay state by removing the second horizontal electric field.

20. The device according to claim 19, wherein a memory mode is provided at the splay state, the high bend state and the π-twist state, and wherein a dynamic mode is provided at the splay state and the twist-splay state.

* * * * *